Sept. 7, 1926. 1,598,703
M. G. BERTHON
MILLING JIG
Filed June 20, 1923 3 Sheets-Sheet 1

Inventor
Marcel G. Berthon.
By His Attorney

Sept. 7, 1926.  
M. G. BERTHON  
MILLING JIG  
Filed June 20, 1923  
1,598,703  
3 Sheets-Sheet 3

Inventor  
Marcel G. Berthon.  
By His Attorney

Patented Sept. 7, 1926.

1,598,703

UNITED STATES PATENT OFFICE.

MARCEL G. BERTHON, OF PRATT CITY, ALABAMA.

MILLING JIG.

Application filed June 20, 1923. Serial No. 646,539.

This invention relates to machine tools and particularly to an improvement whereby a multiplicity of work pieces can be machined simultaneously, and aims to provide a construction whereby while one batch of work is being machined, another batch can be put in place for subsequent machining, thus effecting a saving of time. The invention also contemplates an arrangement whereby an even depth of cut can be made on the work pieces which is parallel with the longitudinal contour of such work pieces, regardless of whether the work is cylindrical, tapered or curved.

An embodiment of the invention is illustrated in the accompanying drawings in which Fig. 1 is a plan view showing a milling jig and a gang of milling cutters adapted to flute the work pieces carried by the jig;

Figure 1:
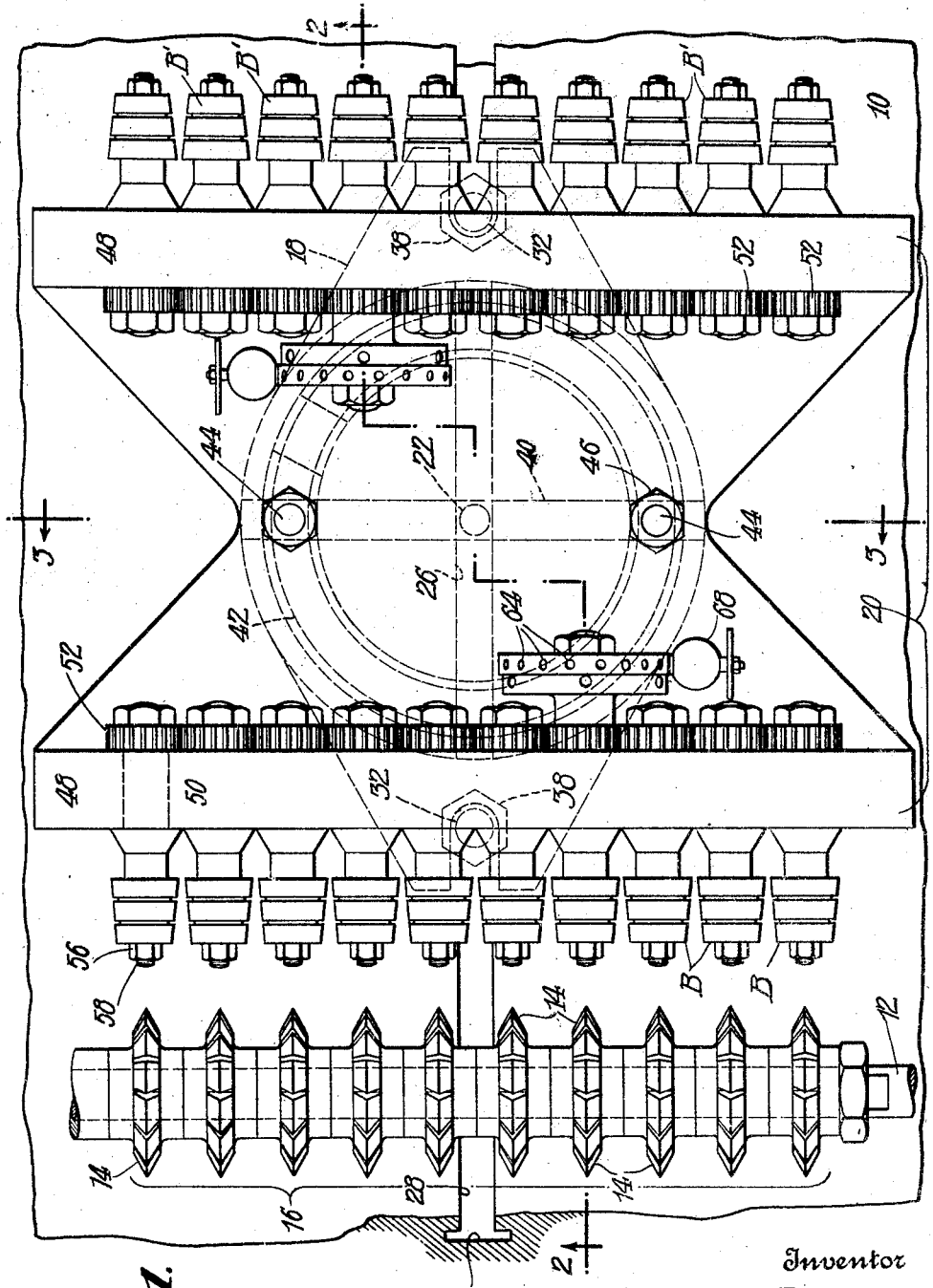
Figure 2:
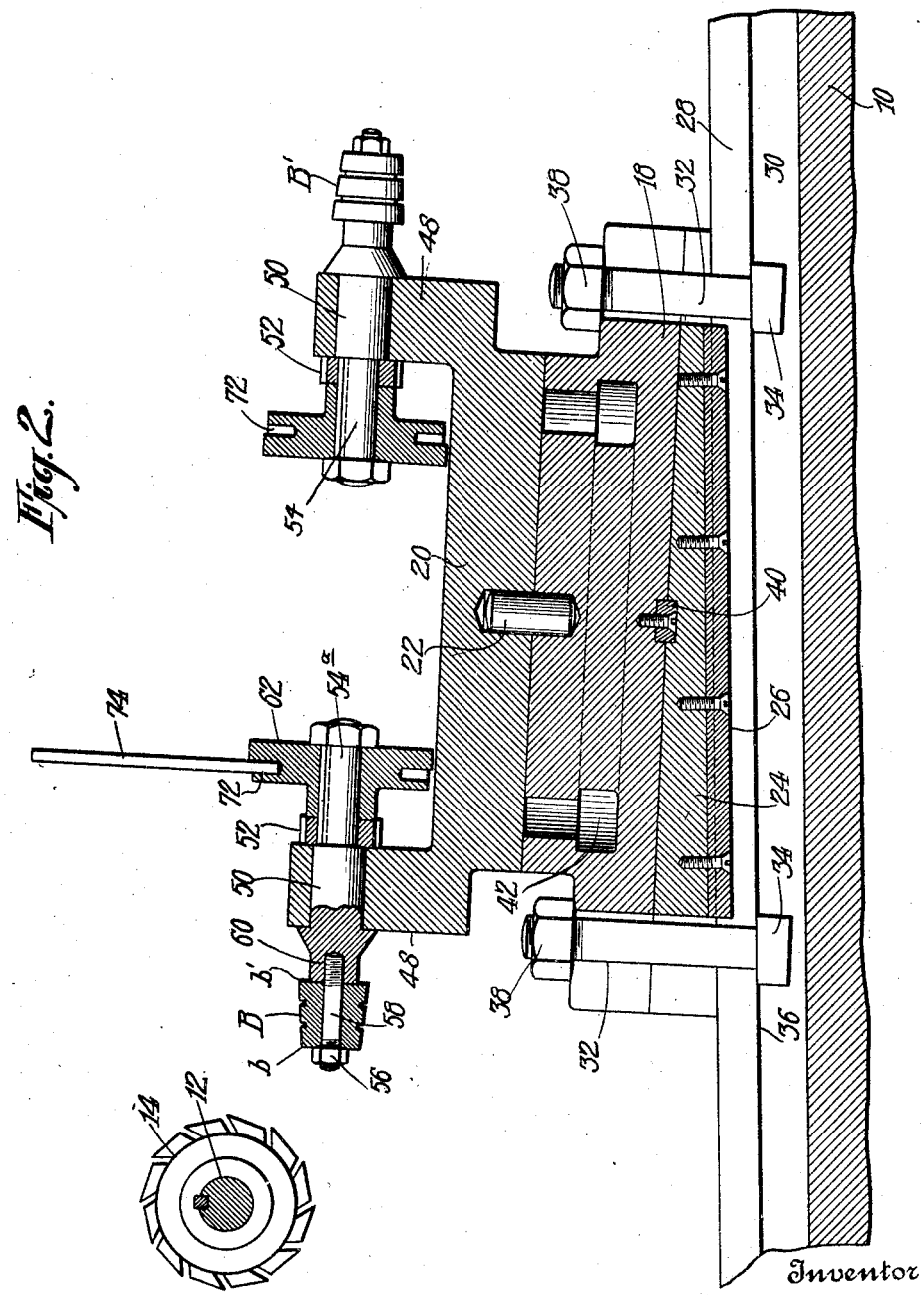
Fig. 2 is a vertical section on the staggered line 2—2 of Fig. 1.
Figure 3:
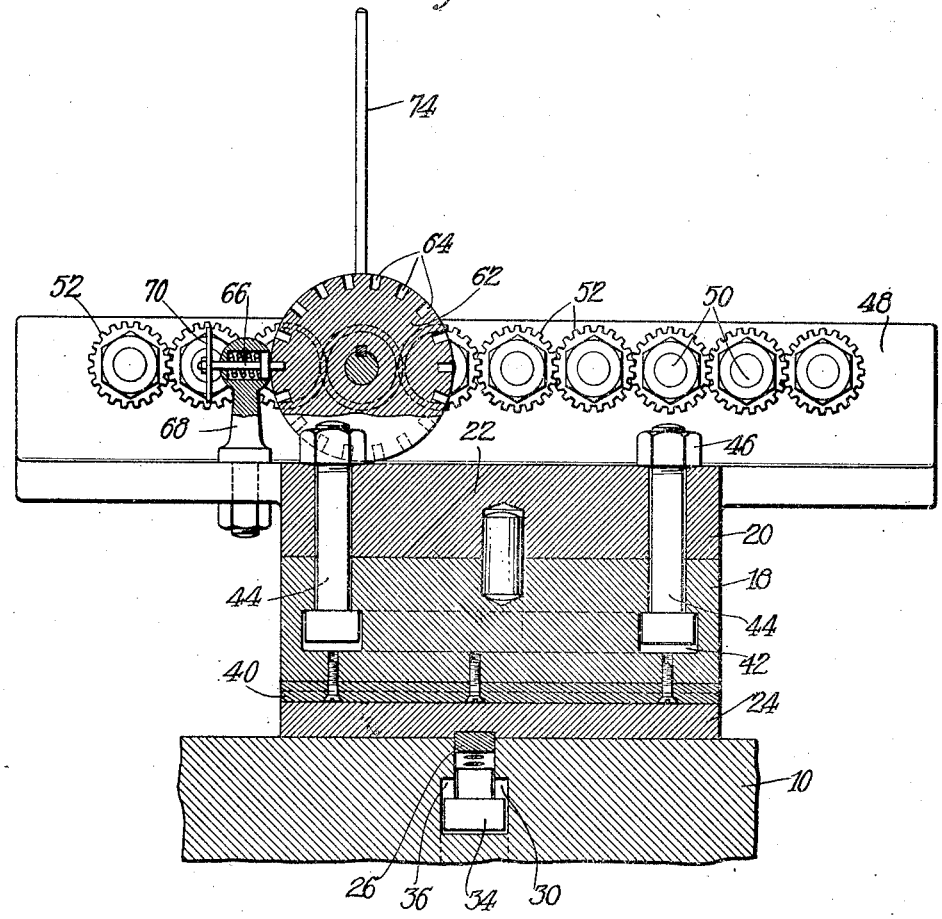
Fig. 3 is a vertical section on line 3—3 of Fig. 1.

Referring in detail to the drawings, 10 represents a carriage or table of a milling machine which is movable toward and away from the arbor 12 of such milling machine on which is carried a multiplicity of milling cutters 14 forming in effect a single gang cutter 16. Secured to the table 10 is a base 18 on which is pivotally mounted a turret 20, which turret is centered by means of a dowel pin 22 projecting partly into the turret and partly into the base as shown in Fig. 2.

Located between the base 18 and the table 10, is an intermediate member 24 and to the underside of this member is secured a key 26 by means of flat head machine screws or their equivalent. The key 26 engages the upper side walls 28 of a T slot 30 formed in the table 10. As shown in Fig. 2 the intermediate member 24 is tapered and thus results in supporting the base 18 and turret 20 in a suitably inclined position which corresponds with the taper of the work carried on the spindles supported by the turret as will hereinafter appear.

The base 18 is secured to the table 10 by bolts 32 having heads 34 which engage the overhang 36 of the T slots 30. By loosening the clamp nuts 38, the base 18 can be secured in any desired location on the table as will be understood. And when the parts are loosened, the intermediate member 24 will move with the base because they are keyed together by means of a key 40.

The base 18 is formed with an annular T slot 42 which is concentric with the dowel pin 22, and bolts 44 which pass through the turret 20 have heads which ride in the annular T slot 42 when the turret is rotated. The bolts 44 carry suitable clamp nuts 46 by which the turret can be firmly clamped to the base as will be understood.

The turret 20 is formed with a pair of upstanding bearing flanges 48 in which are mounted a multiplicity of spindles 50. Each spindle carries a gear 52 which is keyed or otherwise secured to a reduced shank 54.

The work blanks B which are to be fluted by the gang cutter are clamped by means of nuts 56 to studs 58 which are secured in the ends 60 of the spindles. The several gears 52 carried by the spindles 50 are in mesh with one another and form a continuous train. Therefore, if one spindle on either side of the turret is turned, all of the other spindles on that side will be turned with it.

To expedite indexing the work, I provide one of the spindles of each group with an elongated shank 54$^a$ to which is keyed and clamped an index disc 62 having a number of perforations 64 in the periphery thereof corresponding to the number of grooves or flutes to be made in the work blanks B by the milling cutters. A spring pressed plunger 66 carried in a bracket 68 secured to the turret 20 is provided for locking the spindles in their indexed position. The plunger 66 is provided with a thumb piece 70 by which the plunger may be withdrawn, and the disc 62 is formed with a plurality of sockets 72 for the insertion of a rod 74 which the operator pulls to turn the several spindles.

In operation the table 10 is fed toward the gang cutter 16 by any usual or suitable means ordinarily employed in milling machines and similar machine tools. This will cause the cutters 14 to simultaneously flute the work blanks B carried by one gang of spindles. After the cut has been finished and the table withdrawn, the index disc 62 will be turned one notch and the table again moved forward to permit the cutting of another flute or groove. This operation will be repeated until the entire periphery of each blank has been fluted.

While the operation on the blanks B has been going on, another batch of work, namely the blanks B', have been fastened to the gang of spindles 50 on the opposite side of the turret. Therefore, as soon as one batch of work has been fluted, the turret can be quickly turned so as to position the other batch of blanks B' for engagement with the milling cutters, the nuts 46 being first loosened to permit the turning of the turret and subsequently being tightened to clamp it in working position.

The blanks B and B' as shown in Fig. 2 are tapered, and in order to secure an even depth of cut parallel to the longitudinal contour of the blank, the intermediate member 24 is tapered to a corresponding angle. It is apparent as thus arranged the straight line $b$, $b'$ from one end of the blank to the other is parallel with the top surface of the table 10 and as the table is horizontal, and moves forward in a horizontal plane, the bottom of the cut formed in the blank will be parallel with the line $b$, $b'$ thereof which defines its longitudinal contour.

In cases where the blank is neither tapered nor curved, but is merely a cylindrical piece, I can mount the base 18 directly on the table or can use an intermediate member 24 having parallel top and bottom faces as will be understood.

While I have described with great particularity the details of the embodiments of the invention illustrated, it is not to be construed that I am limited thereto as changes in arrangement and substitution of equivalents may be made by those skilled in the art without departing from the invention as defined in the appended claims.

What I claim is:

1. A machine tool jig comprising a turret rotatable on a substantially vertical axis, separate gangs of work carrying spindles mounted directly thereon on opposite sides of said axis, means for clamping said turret so as to hold either gang of spindles and the work pieces carried thereby in position to be acted on by a single gang of cutters, and means for varying the axial position of said spindles with relation to the horizontal line and to suit the contour of the work carried by said spindles, said turret being mounted on a carriage adapted to be moved toward and from said gang cutter.

2. A machine tool jig comprising in combination a carriage movable toward and from the cutters of a machine tool, a rotary support carrying separate gangs of work-spindles and a rigid member between the carriage and said rotary support for varying the axial position of said spindles with relation to a horizontal line to suit the contour of the work carried by the spindles.

3. A machine tool jig comprising in combination a carriage movable toward and from the cutters of a machine tool, means carrying a gang of work spindles and a rigid member for varying the angle of inclination of said spindles with respect to the horizontal so that the cutters will make a cut of even depth parallel to the longitudinal contour of the work.

4. A machine tool jig including separate gangs of work-blank supporting spindles, and a single pivoted member having fixed bearing portions supporting the gangs on opposite sides of the pivot so that the work-blanks can be secured to or removed from one gang of spindles while the blanks on another gang are being machined and means for varying the angle of inclination of said spindles to the horizontal so that the cutters will make a cut of substantially even depth approximately parallel to the longitudinal contour of the work blank.

5. The combination of a gang cutter with a jig comprising a carriage movable toward and from said gang cutter, a base adjustably secured to said carriage, means for changing the angle of inclination between the horizontal surface of the carriage and the surface of said base, a turret mounted on said base, and separate gangs of spindles carried thereby adapted to support different groups of work blanks in position for co-action with said cutter at different times.

6. The combination of a gang cutter with a jig comprising a carriage movable toward and from said gang cutter, a base adjustably secured to said carriage, a turret mounted on said base carrying separate gangs of work supporting spindles, and a tapered member between said base and said carriage for axially positioning the spindles according to the contour of the work carried thereby.

7. A machine tool jig including a turret, a gang of work-carrying spindles carried thereon, a gang cutter, a table movable toward and from said cutter for supporting said turret and spindles, a rigid means for varying the angular position of said spindles with respect to said table so as to secure a cut of determined depth and of a contour corresponding to the contour of the blanks carried by said spindles.

8. The combination with a gang-cutter and a table movable relatively to the cutter, of spindles carried by the table for supporting a multiplicity of work blanks, and a rigid tapered member for varying the angularity between the spindles and the table so as to secure a cut of predetermined longitudinal contour.

9. The combination with a gang-cutter and a table movable relatively to the cutter, separate gangs of spindles carried by the table for supporting a multiplicity of work blanks, and means for varying the angularity between the spindles and the table so as to secure a cut of predetermined longitudinal contour, and means carried by said table adapted to be turned so as to move the blanks carried by either gang of spindles into position to be machined by said cutter.

In witness whereof, I have hereunto signed my name.

MARCEL G. BERTHON.